(No Model.) 6 Sheets—Sheet 1.
L. H. NASH.
ROTARY WATER METER.
No. 449,821. Patented Apr. 7, 1891.
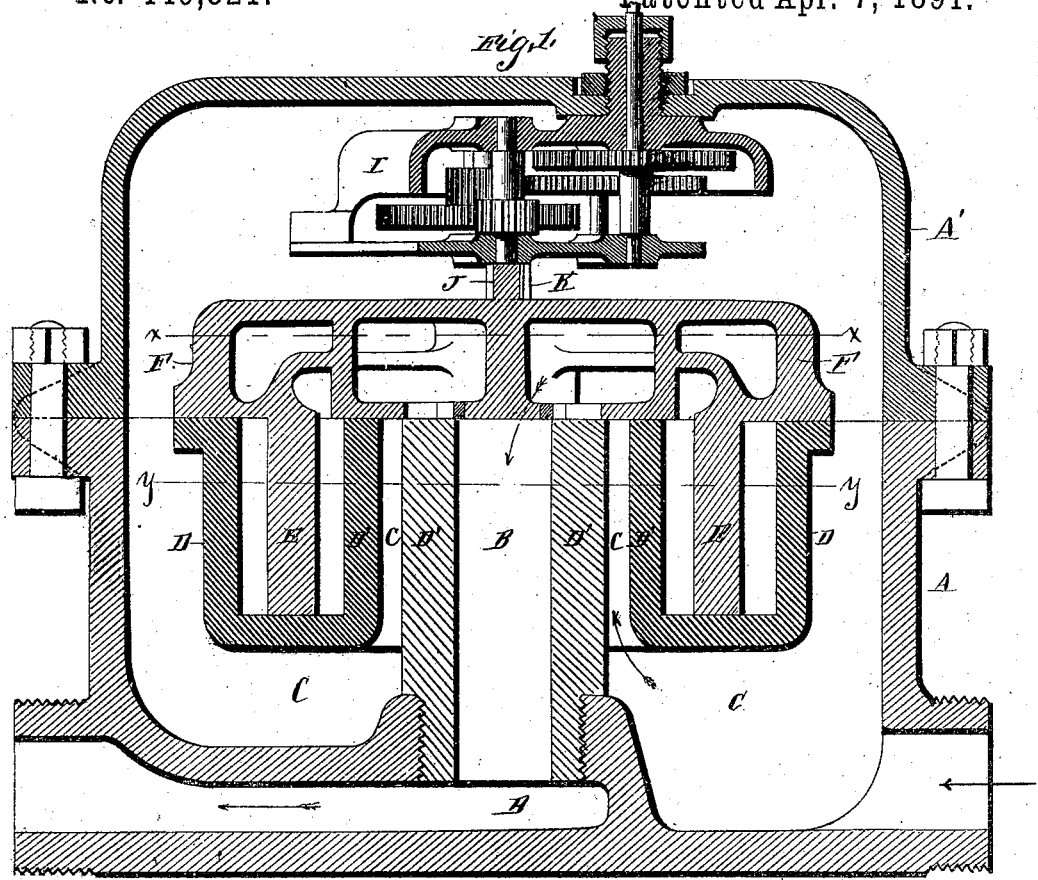
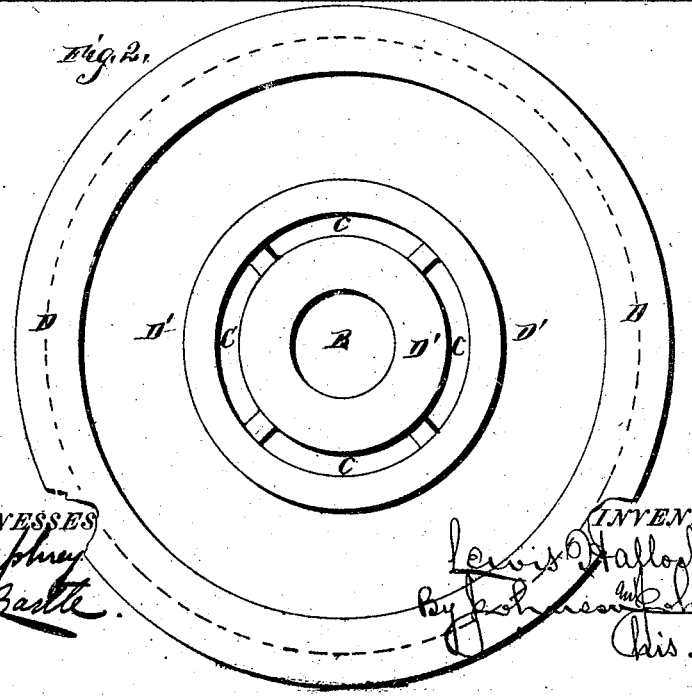
WITNESSES
W. H. Pumphrey
Norvell Bartle
INVENTOR
Lewis Hallock Nash
By Johnson & Johnson
his Attorneys (No Model.)　　　　　　　L. H. NASH.　　　　6 Sheets—Sheet 2.
ROTARY WATER METER.

No. 449,821.　　　　　　　　　　　　　　　Patented Apr. 7, 1891.

WITNESSES　　　　　　　　　　　　　　　　INVENTOR
Walter H. Pumphrey　　　　　　　　　　　Lewis Hallock Nash
Howell Bartle　　　　　　　　　　　　　By Johnson & Johnson
　　　　　　　　　　　　　　　　　　　　　his Attorneys (No Model.)   6 Sheets—Sheet 3.
L. H. NASH.
ROTARY WATER METER.

No. 449,821. Patented Apr. 7, 1891.

WITNESSES
Walter H. Pumphrey
Howell Bartle

INVENTOR
Lewis Hallock Nash
By Johnson and Johnson
his Attorneys (No Model.) 6 Sheets—Sheet 4.

L. H. NASH.
ROTARY WATER METER.

No. 449,821. Patented Apr. 7, 1891.

WITNESSES

INVENTOR
Lewis Hallock Nash
By Johnson & Johnson
his Attorneys.

(No Model.) 6 Sheets—Sheet 5.
L. H. NASH.
ROTARY WATER-METER.

No. 449,821. Patented Apr. 7, 1891.

WITNESSES
INVENTOR
Lewis Hallock Nash
By Johnson & Johnson
his Attorneys.

(No Model.)

L. H. NASH.
ROTARY WATER METER.

No. 449,821. Patented Apr. 7, 1891.

UNITED STATES PATENT OFFICE.

LEWIS HALLOCK NASH, OF SOUTH NORWALK, CONNECTICUT, ASSIGNOR TO THE NATIONAL METER COMPANY, OF NEW YORK, N. Y.

ROTARY WATER-METER.

SPECIFICATION forming part of Letters Patent No. 449,821, dated April 7, 1891.

Application filed December 13, 1888. Serial No. 293,425. (No model.)

*To all whom it may concern:*

Be it known that I, LEWIS HALLOCK NASH, a citizen of the United States, residing at South Norwalk, Fairfield county, State of Connecticut, have invented new and useful Improvements in Fluid-Meters, of which the following is a specification.

My invention consists of a novel fluid-meter in which the piston has an orbit motion— that is, a motion of translation which causes the piston to sweep around within the case— said piston being provided with movable slides or arms which have an independent movement relative to said piston and which form, by contact with the case-walls, lines of division which separate the inlet from the outlet spaces. With the orbit motion the piston may be made to rotate about its own axis. Instead of the piston being substantially circular, as herein illustrated, it may have various forms, and instead of moving in a circular orbit its center may describe any suitable path. Neither is my invention confined to any particular form or arrangement of slides or arms.

The specific features of novelty will be particularly set forth in the claims concluding this specification.

Figure 3:
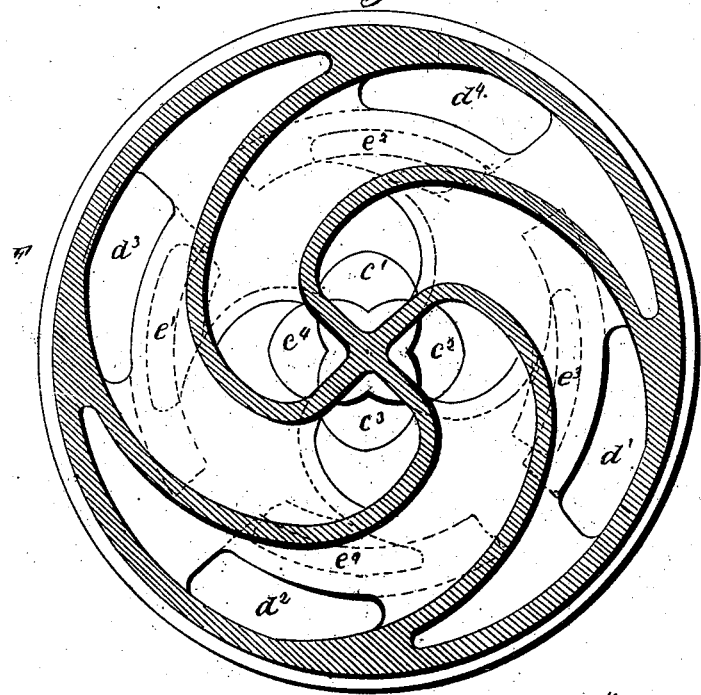
Figure 4:
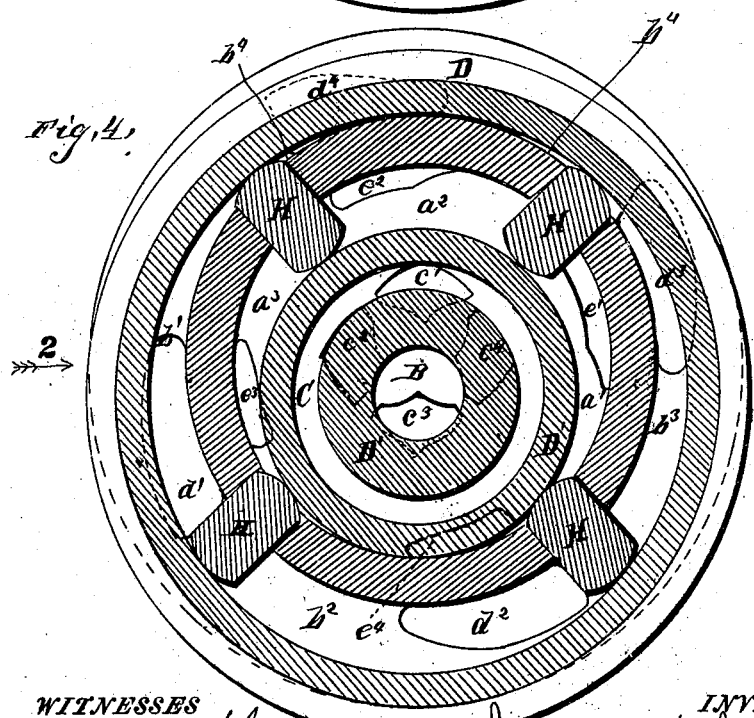
Figure 5:
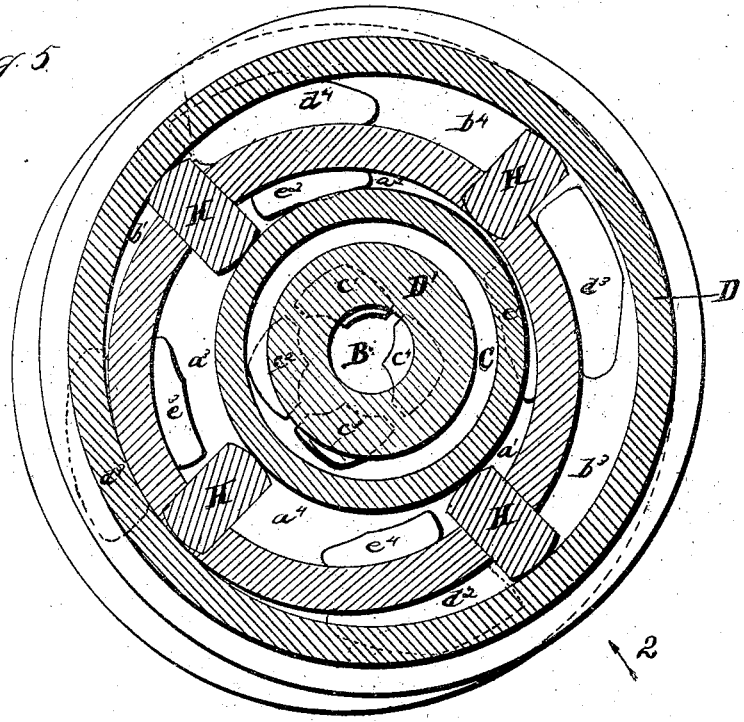
Figure 6:
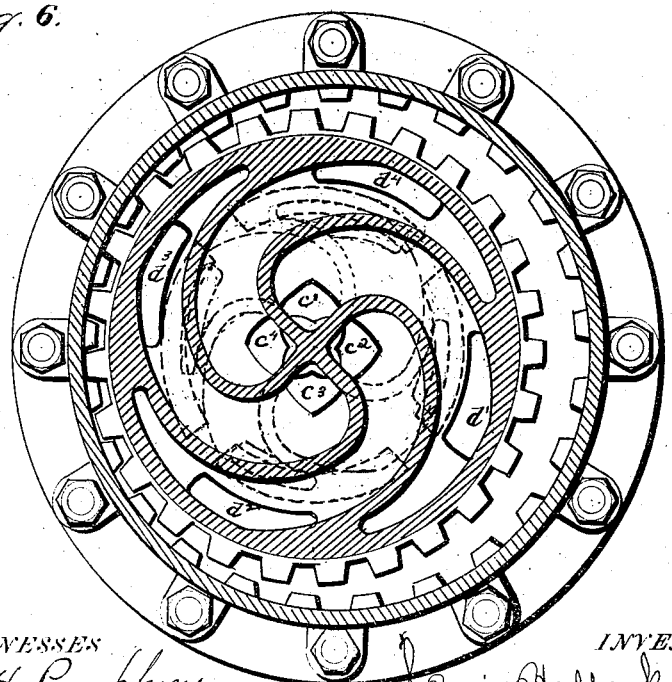
Figure 7:
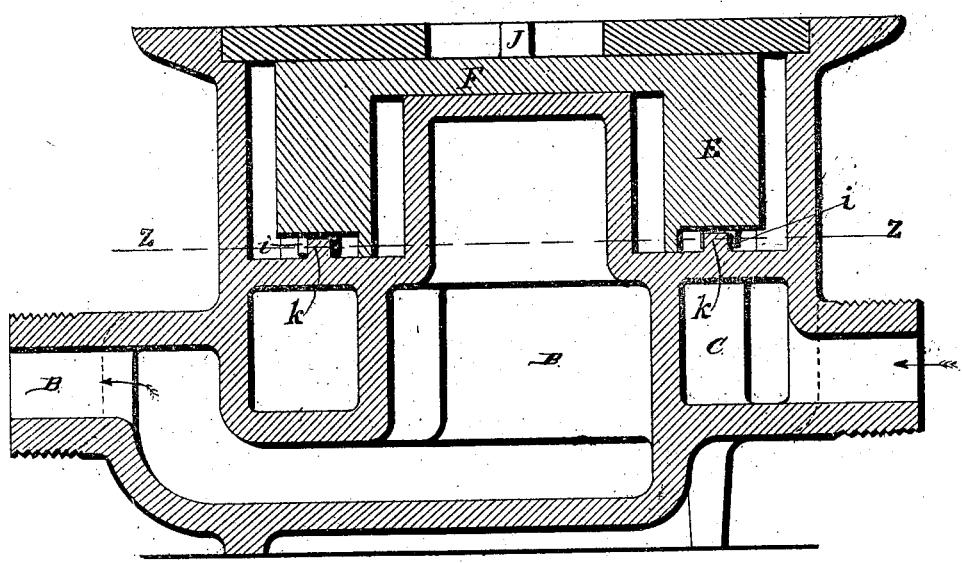
Figure 8:
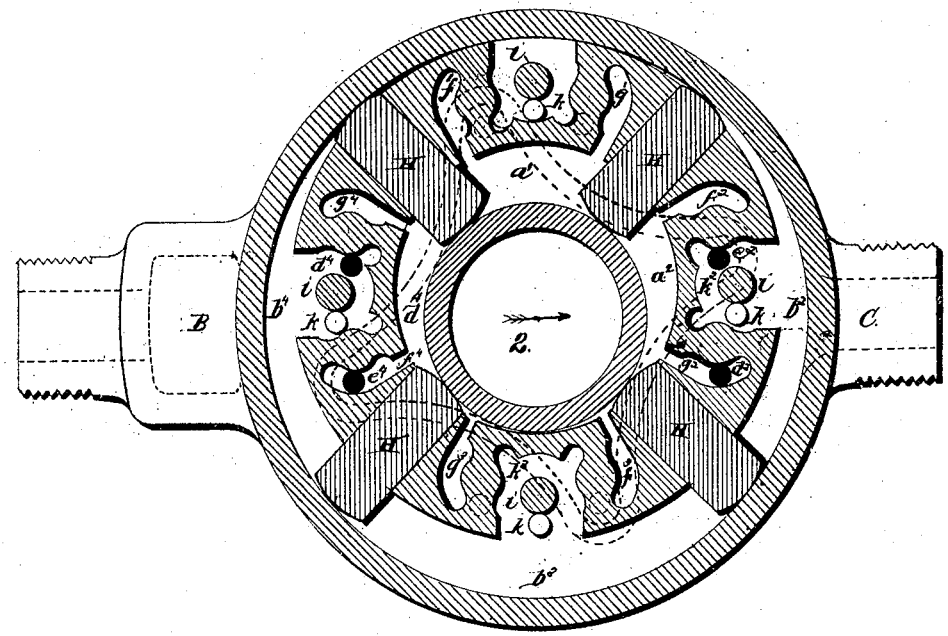
Figure 9:
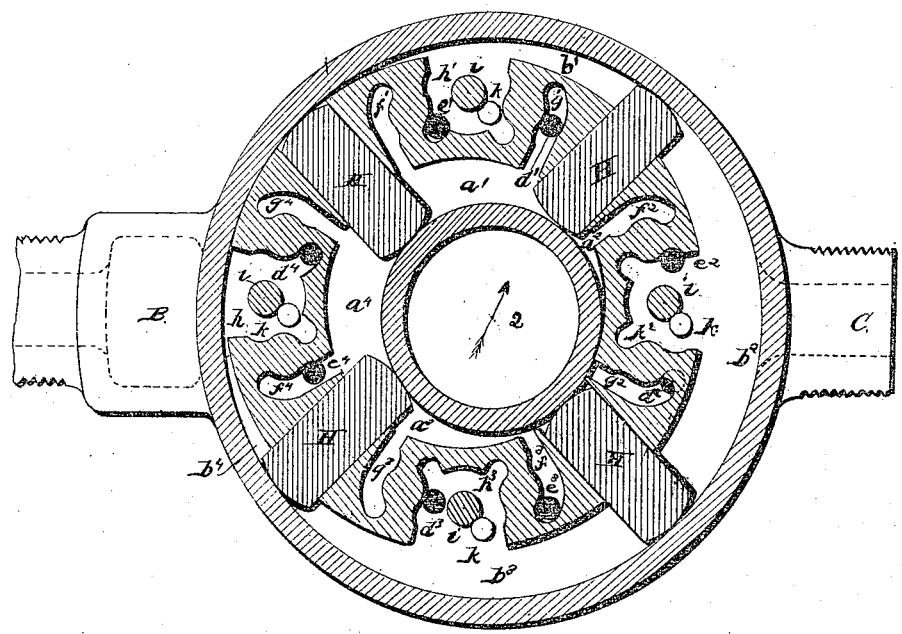
Figure 10:
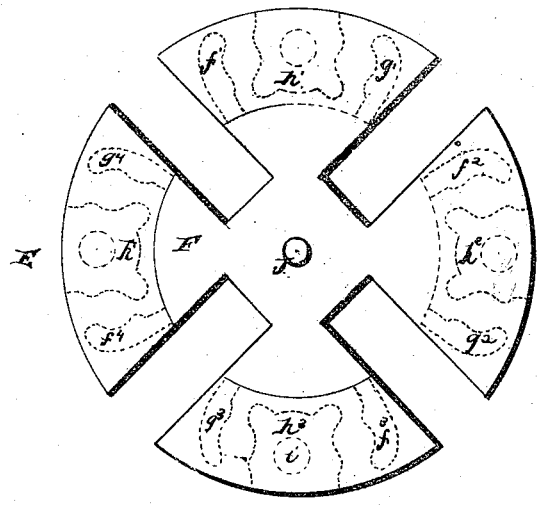
Figure 11:
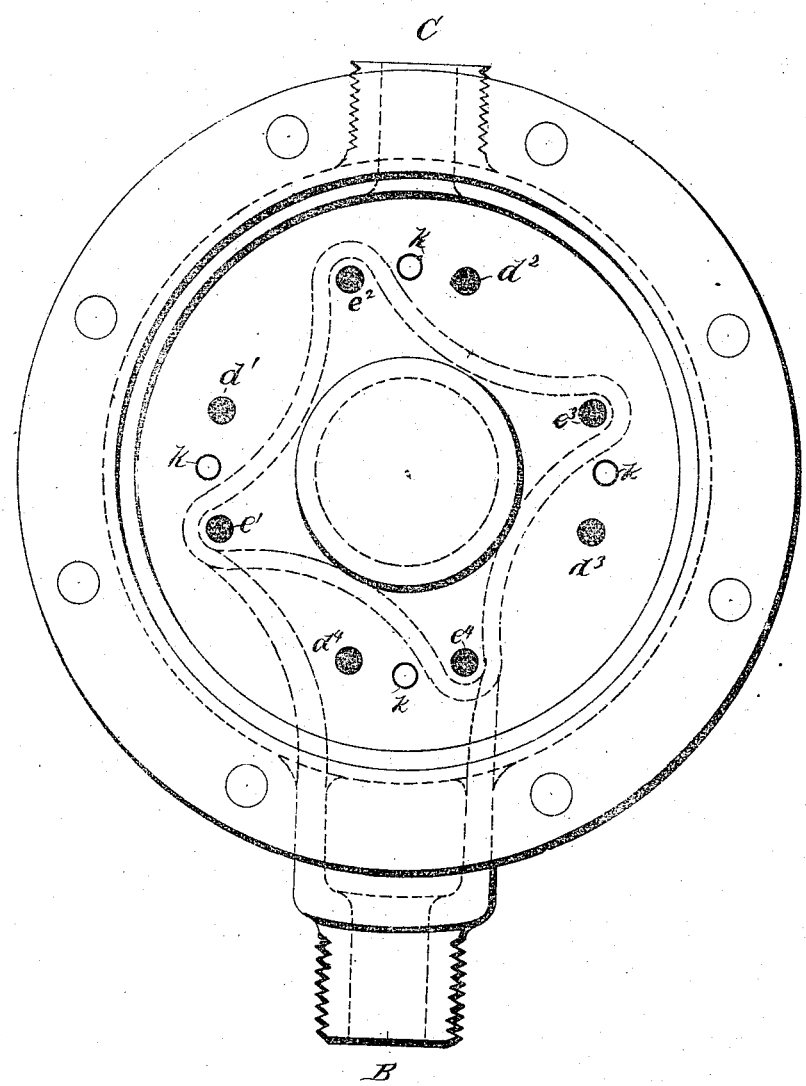

Figure 1 represents a vertical section of a meter embodying my invention. Fig. 2 is a plan of the lower sections of the measuring-chamber. Fig. 3 is a section on the line $x$ of Fig. 1, through the top plate of the piston, showing the ports and connecting-passages. Fig. 4 is a section on the line $y$ of Fig. 1, looking upward. Fig. 5 is a similar view showing the parts in a different position. Fig. 6 is a section of piston adapted to have not only an eccentric motion, but also a motion of rotation about its own axis. Fig. 7 is a vertical section of a modified form of meter. Fig. 8 is a section on the line $z$ of Fig. 7. Fig. 9 shows a different position of the piston. Fig. 10 is a top view of the piston. Fig. 11 is a plan of the case-chamber, showing the inlet and discharge ports.

The following is a description of the accompanying drawings in such full, clear, and exact terms as to enable any one skilled in the art to which my invention appertains to practice it in its preferred form.

Referring to Figs. 1 and 5, the measuring device proper is inclosed in an exterior case A A', which protects the parts from injury and has round it the inlet and discharge passages which connect with the measuring device proper. The measuring device is composed of a case D, of cylindrical form, and has a central abutment D', in which are formed an annular inlet-passage C and an outlet-passage B, and which terminates in a screw-thread securing the device to the case A. The piston E is of cylindrical form and is slotted to receive the slides H, which fill the space between the case-walls and the abutment D.

As seen in Figs. 4 and 5, the piston and the slides H divide the case-chamber into eight measuring-spaces, of which four $a'$ $a^2$ $a^3$ $a^4$ are within the ring-piston and four $b'$ $b^2$ $b^3$ $b^4$ are without the ring-piston, and these spaces continually increase and diminish in volume as the piston sweeps around the case. The piston carries a head-plate F, which has formed in it ports and passages adapted to coact with the ports or passages B and C of the case-abutment D'. As shown, the head-plate F has four central ports $c'$ $c^2$ $c^3$ $c^4$, and these ports communicate with branch passages, one set of which $d'$ $d^2$ $d^3$ $d^4$ (shown in full lines in Fig. 3) communicate with the case-spaces $b'$ $b^2$ $b^3$ $b^4$, while the other set $e'$ $e^2$ $e^3$ $e^4$ (shown in dotted lines in the same figure) communicate with the measuring-spaces $a'$ $a^2$ $a^3$ $a^4$. The movement of the piston is communicated to the registering-gearing I through a stud J, which drives a crank-arm K in a well-known manner.

The meter illustrated and hereinbefore described operates as follows: The piston being in the position shown in Fig. 5, water enters the annular space C of the abutment and the ports $c^2$ and $c^3$ of the valve through the passages $d^2$ $d^3$ into the exterior measuring-space $b^2$ and $b^3$, and also through the passages $e^2$ and $e^3$ into the interior measuring-spaces $a^2$ and $a^3$, while the water escapes from the exterior measuring-spaces $b'$ and $b^4$ through the passages $d'$ and $d^4$ and ports $c'$ and $c^4$ to the passage B, and also escapes from the interior spaces $a'$ and $a^4$ through the passages $e'$ and $e^4$ and ports $c'$ and $c^4$ to the outlet-passage B.

Hence the piston is driven in the direction of the arrow 2 to the position shown in Fig. 4, wherein the port $c^2$ is just closing communication with the inlet-passage C and about to open into the discharge-passage B, while the port $c^4$ has just closed communication with the discharge-passage B and is about to open into the inlet-port C. In this condition the spaces $b^2$, $b^4$, $a^2$, and $a^4$ are neutral, and water enters the ports $c'$ and passages $d'$ and $e'$ to the spaces $b'$ and $a'$ and escapes from the spaces $b^3$ and $a^3$ through passages $d^3$ and $e^3$ into the port $c^3$ and outlet-passage B, driving the piston in the direction of the arrow 2. In this way the piston sweeps around the case, enlarging and contracting the measuring-spaces, while the motion of its headplate fastened to said piston controls the opening and closing of the inlet and discharge ports therefor at the proper time to admit and discharge the water. If it is desired to have the piston rotate upon its own axis, I may form gear-teeth on the piston-head and corresponding teeth on the case, as shown in Fig. 6; but the operation of the measuring-spaces and of the ports will be substantially the same.

In Figs. 7 to 11 a meter and piston is shown having the same displacing action; but the arrangement of the inlet and discharge ports is different. Here they are controlled by the piston proper instead of by the web or head thereof.

The meter-case shown is formed in a single casting. As seen in Figs. 7 and 11, it has a supply-passage C, which connects with a series of inlet-ports $d'$ $d^2$ $d^3$ $d^4$, and a discharge-passage B, which connects with the discharge-ports $e'$ $e^2$ $e^3$ $e^4$. The piston E is supplied with the web F, which carries a pin J, driving the registering device as before, while the piston proper has formed in it port grooves or chambers $f'$ $g'$ $h'$, &c., which coact with the head-ports to control the flow of the water. In order to guide the piston in its movement, I have shown a series of studs $i$, which are secured to the piston and which revolve about in contact with studs $k$. The slides H are inserted as before and divide the case-chamber into measuring-spaces $a'$ $b'$, &c.

Referring to Fig. 9, water is entering spaces $b^3$ $b^4$ and $a'$ $a^2$ through the inlet-ports $d^3$, $d^4$, $d'$, and $d^2$ and escaping from the spaces $b'$, $b^2$, $a^3$, and $a^4$ through the discharge-ports $e'$, $e^2$, $e^3$, and $e^4$, moving the piston in the direction of the arrow 2 to the position shown in Fig. 8, in which the spaces $a'$, $b'$, $a^3$, and $b^3$ are neutral, and water enters the spaces $a^2$ and $b^4$ through ports $d^2$ and $d^4$ and escapes from spaces $a^4$ and $b^2$ through ports $e^4$ and $e^2$, driving the piston in the direction of the arrow 2.

I have shown the pistons E in contact with the walls of the case-chamber; but it is not necessary to form a joint between these parts, as the slides H are capable of dividing the case-chamber into measuring-spaces.

It will of course be understood that my invention is not limited to the precise parts and combinations of parts herein illustrated and described, as many modifications may be employed without departing from the spirit of my invention or the scope of the claims. It will also be understood that since the spaces both inside and outside the piston operate to displace the water I may construct a meter having either the inside or the outside displacing action only, and I do not confine my invention to the double-acting device shown.

What I claim, and desire to secure by Letters Patent, is—

1. In a water-meter, the combination of an inclosing case, a piston having an orbit motion therein, provided with arms having an independent motion relative to said piston, forming contact with the case-walls at a plurality of points to separate the receiving from the discharging spaces, and suitable inlet and outlet ports, substantially as described.

2. In a water-meter, the combination of an inclosing case, a piston having an orbit motion therein, and also a motion of rotation on its own axis, provided with arms having an independent movement with relation to said piston, forming contact with the case-walls to separate the receiving from the discharging spaces, and suitable inlet and outlet ports, substantially as described.

3. In a water-meter, the combination of an inclosing case, a free piston having an orbit motion therein, provided with arms having an independent movement with relation to said piston, forming contact with the case-walls to separate the receiving from the discharging spaces, and suitable inlet and outlet ports, substantially as described.

4. In a water-meter, the combination of an inclosing case, a hollow piston having an orbit motion therein, provided with arms having an independent movement with relation to said piston, forming contact with the case-walls to divide the chambers both inside and outside of said piston into separate receiving and discharging spaces, and suitable inlet and outlet ports, substantially as described.

5. In a water-meter, an inclosing case and a piston having an orbit motion therein, provided with arms having an independent movement with relation to said piston, combined with ports controlled by the piston itself or the arms thereof for admitting and discharging the water, substantially as described.

6. In a water-meter, the combination of an inclosing case, a piston having an orbit motion therein, provided with arms having an independent motion therein with relation to said piston and provided with a transverse web containing ports, substantially as described.

7. The combination, in a water-meter, of an inclosing case, with a measuring device inclosed thereby, composed of a case D of cylindrical form, having a central concentric abutment D', in which are formed an annular inlet-passage C and a central outlet-passage B, a cylindrical ring-piston having an orbit motion within the chamber of the case D and provided with radial slides H, and a head-plate F, capping the measuring device, moving with the piston and containing ports and passages co-operating with the said inlet and outlet passages, substantially as described.

8. In a water-meter, the combination of an inclosing case having a central concentric abutment wherein is formed the inlet and the outlet passages, a ring-piston having an orbit motion within the chamber of said case and provided with slides arranged to divide the said chamber into measuring-spaces within the ring-piston and without the said piston, and a head-plate capping and moving with said piston, having ports and passages coacting with the said inlet and outlet passages, substantially as herein set forth.

9. In a water-meter, a measuring device consisting of the case D, having a central concentric abutment forming the inlet and the outlet passages C and B, a ring-piston having slides and a head-plate, the latter having ports and passages and seated loosely upon the said case and its abutment, and the ring-piston depending from said head-plate, and having an orbit motion within the chamber of said case, substantially as described.

10. A measuring device for a water-meter, consisting of a ring-piston having radial slides, a head-plate of greater diameter than the said piston fixed to it and having ports and passages, and a case D, having a central concentric abutment containing the inlet and the outlet passages, and upon which the said head-plate has a joint-forming seat and has an orbit movement with the piston, substantially as described.

11. A measuring device for water-meters, consisting of an open-top chamber having a concentric central abutment formed with vertical through passages for the inflow and outflow of the water, and a ring-piston having radial slides and a suspending head-plate provided with ports and passages controlled by the movements of the piston and coacting with the inlet and the outlet passages, substantially as described.

In testimony whereof I have hereunto set my hand in the presence of two subscribing witnesses.

LEWIS HALLOCK NASH.

Witnesses:
JNO. H. NORRIS,
PERCY MACCALLUM.